US009841980B2

(12) United States Patent
Anderson et al.

(10) Patent No.: US 9,841,980 B2
(45) Date of Patent: Dec. 12, 2017

(54) EXTENSIBLE AND APPLICATION-ADAPTABLE TOOLBAR FOR WEB SERVICES

(75) Inventors: Christine Anderson, San Jose, CA (US); Sara Liu Yang, Fremont, CA (US); Erez Kikin-Gil, Mountain View, CA (US); Sandra Hirsh, Palo Alto, CA (US); Tyler Schnoebelen, San Francisco, CA (US); Wendy Chan, Palo Alto, CA (US); Nancy Jane Bell, Menlo Park, CA (US); Thomas Jan Stovicek, Mountain View, CA (US); Jackie Sandoval, Los Gatos, CA (US)

(73) Assignee: Microsoft Technology, LLC, Redmond, WA (US)

( * ) Notice: Subject to any disclaimer, the term of this patent is extended or adjusted under 35 U.S.C. 154(b) by 1190 days.

(21) Appl. No.: 12/110,188

(22) Filed: Apr. 25, 2008

(65) Prior Publication Data
US 2009/0271735 A1 Oct. 29, 2009

(51) Int. Cl.
*G06F 3/0482* (2013.01)
*G06F 9/44* (2006.01)

(52) U.S. Cl.
CPC .......... *G06F 9/4443* (2013.01); *G06F 3/0482* (2013.01)

(58) Field of Classification Search
CPC ........................... G06F 3/0482; G06F 17/3089
USPC ........................................................ 715/828
See application file for complete search history.

(56) References Cited

U.S. PATENT DOCUMENTS

| 4,692,757 | A | 9/1987 | Tsuhara |
| 5,699,535 | A | 12/1997 | Amro |
| 6,282,548 | B1 * | 8/2001 | Burner et al. |
| 6,300,947 | B1 | 10/2001 | Kanevsky |
| 6,384,849 | B1 * | 5/2002 | Morcos et al. ............... 715/810 |
| 6,557,027 | B1 | 4/2003 | Cragun |
| 6,624,831 | B1 * | 9/2003 | Shahine et al. ............... 715/815 |
| 6,784,900 | B1 * | 8/2004 | Dobronsky et al. .......... 715/744 |

(Continued)

FOREIGN PATENT DOCUMENTS

EP 1 408 398 A2 4/2004

OTHER PUBLICATIONS

Unknown, "Live Documents," available at http://www.live-documents.com/screenshots05.html, printed on Jan. 11, 2008, 1 page.

(Continued)

*Primary Examiner* — Alvin Tan
(74) *Attorney, Agent, or Firm* — Liang IP, PLLC

(57) ABSTRACT

Providing a user interface (UI) on a web page. A toolbar section is defined on the web page. The web page includes a content section being different and separate from the toolbar section, and the content section displays additional content of the web page. One or more groups are specified to include one or more action controls associated therewith. Each of the specified groups has a group identifier associated therewith. The one or more action controls are displayed according to the specified groups in the toolbar section of the web page. Each of the one or more displayed action controls includes properties associated therewith, and the included properties define at least one of the following: a name of the action control, a link of the action control, the group identifier of the action control, and a classification identifier of the action control.

20 Claims, 13 Drawing Sheets

(56) References Cited

U.S. PATENT DOCUMENTS

| | | |
|---|---|---|
| 6,826,729 B1 | 11/2004 | Giesen et al. |
| 7,036,087 B1 | 4/2006 | Odom |
| 7,127,685 B2 | 10/2006 | Canfield et al. |
| 7,222,303 B2* | 5/2007 | Oren et al. .............. 715/744 |
| 7,305,470 B2* | 12/2007 | Tom et al. .............. 709/225 |
| 7,346,857 B2* | 3/2008 | Sobeski ............ G06F 9/4443 715/848 |
| 7,370,282 B2 | 5/2008 | Cary |
| 7,529,766 B2* | 5/2009 | Shilo et al. |
| 7,793,227 B2* | 9/2010 | Wada et al. .............. 715/779 |
| 8,375,325 B2* | 2/2013 | Wuttke .............. 715/810 |
| 2001/0029527 A1* | 10/2001 | Goshen .............. 709/218 |
| 2002/0057287 A1 | 5/2002 | Crow |
| 2003/0014442 A1 | 1/2003 | Shiigi et al. |
| 2003/0025737 A1 | 2/2003 | Breinberg |
| 2003/0107591 A1 | 6/2003 | Jameson |
| 2003/0197738 A1 | 10/2003 | Beit-Zuri et al. |
| 2004/0122803 A1 | 6/2004 | Dom et al. |
| 2004/0125130 A1* | 7/2004 | Flamini et al. .............. 345/738 |
| 2005/0039142 A1 | 2/2005 | Jalon et al. |
| 2005/0235034 A1 | 10/2005 | Chen et al. |
| 2005/0251755 A1 | 11/2005 | Mullins, II et al. |
| 2005/0278651 A1* | 12/2005 | Coe et al. .............. 715/779 |
| 2006/0036964 A1 | 2/2006 | Satterfield et al. |
| 2006/0041460 A1 | 2/2006 | Aaron |
| 2006/0095865 A1* | 5/2006 | Rostom .............. 715/810 |
| 2006/0179060 A1 | 8/2006 | Shilo et al. |
| 2006/0224997 A1 | 10/2006 | Wong et al. |
| 2006/0253586 A1* | 11/2006 | Woods .............. 709/226 |
| 2006/0271910 A1 | 11/2006 | Burcham et al. |
| 2007/0055943 A1 | 3/2007 | McCormack et al. |
| 2007/0143662 A1 | 6/2007 | Carlson et al. |
| 2007/0157118 A1 | 7/2007 | Wuttke |
| 2007/0192725 A1 | 8/2007 | Chen et al. |
| 2007/0245246 A1 | 10/2007 | Oren et al. |
| 2007/0279417 A1 | 12/2007 | Garg et al. |
| 2008/0065737 A1* | 3/2008 | Burke .............. G06F 17/30058 709/217 |
| 2009/0177997 A1* | 7/2009 | Do et al. .............. 715/789 |
| 2013/0042188 A1* | 2/2013 | Dobronsky .............. 715/760 |

OTHER PUBLICATIONS

Unknown, "Use the Ribbon," available at http://office.microsoft.com/en-us/help/HA100898951033.aspx, printed on Jan. 11, 2008, 3 pages.

Unknown, "Review and Visual Tour: Microsoft's 2007 Office Beta 2," available at http://www.computerworld.com/action/article.do?command=viewArticleBasic&taxonomyName=Windows&articleId=9000690&taxonomyId=125, May 23, 2006, 4 pages.

Pirillo, Chris, "Office 2007 Ribbon Vs Menu," available at http://chris.pirillo.com/2007/07/23/office-2007-ribbon-vs-menu/, Jul. 23, 2007, 6 pages.

Unknown, "Sabeer Bahtia," Wikipedia, last modified Apr. 20, 2008, USA.

Notification of Transmittal of the International Search Report and the Written Opinion of the International Searching Authority in International Application No. PCT/US2009/035057, dated Oct. 6, 2009, 11 pgs.

Office Action for Taiwan Patent Application No. 98108254 dated Apr. 16, 2014, 14 Pages.

"Third Office Action Issued in Chinese Patent Application No. 200980114844.6", Mailed Date: Aug. 5, 2015, 6 Pages.

First Office Action issued in Chinese Application No. 200980114844.6, dated Nov. 5, 2012, 13 pages.

Final Office Action issued in Chinese Application No. 200980114844.6, dated Jul. 22, 2013, 15 pages.

Extended European Search Report issued in EP Application No. 09735125.8, dated Jul. 29, 2011, 5 pages.

Office Action issued in Taiwanese Application No. 98108254, dated Apr. 22, 2014, 13 pages.

Summery of Office Action for Office Action issued in Taiwanese Application No. 98108254, dated Apr. 22, 2014, 1 page.

* cited by examiner

EXTENSIBLE AND APPLICATION-ADAPTABLE TOOLBAR FOR WEB SERVICES

BACKGROUND

As high speed Internet access becomes more common and affordable, the Internet is emerging as a new platform for online-based applications and more interactive content. For example, online-based or web-based electronic mail (e-mail) accounts have been available for some time and have provided users convenient and ready access to their e-mails from a web browser. These web-based e-mail accounts typically provide a set of action controls in a one or two lined toolbar including functions/actions, such as "send," "reply," "reply all," or the like.

While the controls in the toolbar have been useful, several inconveniences continue to exist. For example, the toolbar usually occupies a pre-determined amount of space on the web page, but that space also should not be too much on the web page such that the actual content (i.e., e-mail message content) should be given the maximum amount of viewable area to the user. With these considerations, current toolbar on the web page typically could only provide some of the most commonly used controls. In order for the user to use additional controls, the user typically needs to navigate to other areas, such as "Options" or other "account setting areas" to learn about other controls or functionalities provided by the service provider.

In addition, the user may also install on a local computer a toolbar that attaches to a web browser application. For example, it is known that the user may download a toolbar as an "add-on application" to the web browser application. The downloaded toolbar provides an expedited access or authentication to a particular server or a convenient online search or query. The toolbar may also provide other controls or tools, such as "highlighting text," "search with the web page," or the like.

While these downloadable toolbars provide directed or particular tools for the user, they nevertheless occupy viewable area on the web browser application even when the users do not wish to use these added tools or functionalities. When the user visits one of the web-based e-mail account service, the spaces occupied by the downloadable toolbar and the toolbar on the web page further limit the amount of content viewable areas available to the user.

SUMMARY

Embodiments of the invention overcome the deficiencies of existing implementations by providing a flexible toolbar within a web page providing one or more services to users. The toolbar can selectively group action controls according to a type or a category such that the toolbar can selectively display one or more action controls as the viewable area of the web page changes. In another embodiment, the toolbar within the web page may be displayed according to an order of importance or hierarchy in the group such that, especially when the viewable area of the web page is decreased, only the more important action controls or the action controls in a higher hierarchy may be displayed.

Alternative embodiments of the invention further incorporate the flexible toolbar to the chrome or the toolbar or user interface section of the client-based web browser application. For example, instead of having a static toolbar that needs to be downloaded, alternative aspects of the invention enable the dynamic and flexible toolbar to be application-adaptable to the web browser application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
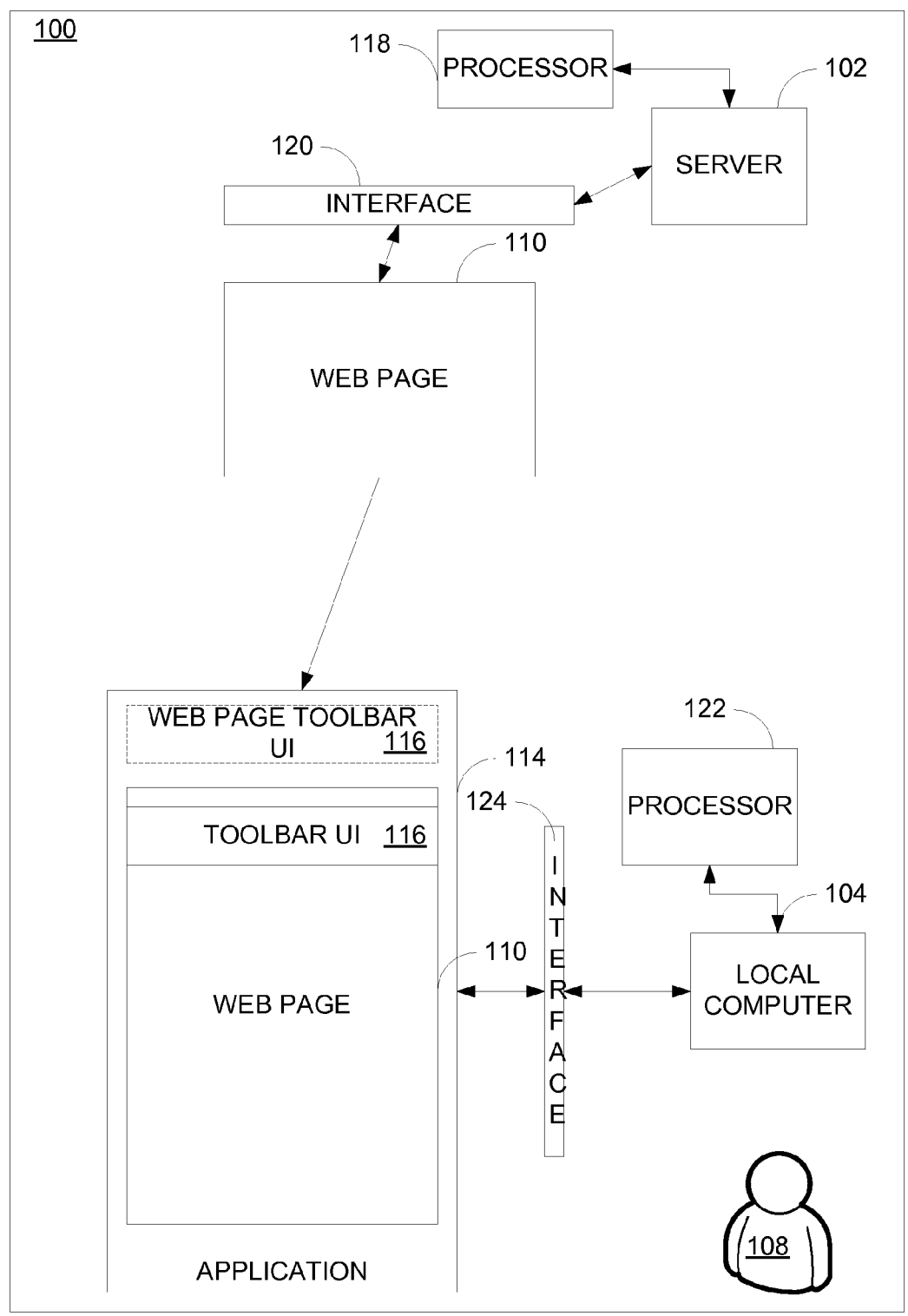
FIG. 1 is an exemplary embodiment of a system for providing a flexible toolbar on a web page according to an embodiment of the invention.

Embodiments of the invention flexible online toolbar or UI on a web page such that action controls in the toolbar and UI are grouped according to priority. Referring now to FIG. 1, a diagram illustrates a system 100 for providing a flexible web page toolbar UI on a web page according to an embodiment of the invention. In one example, the system 100 includes a server 102 which provides services to one or more other computers, such as other server computers. In one example, the server 102 may be part of a group of servers that provide web or online services to a user 108. For example, the server 102 may include a web server, a front-end server, a back-end server, a database server, an authentication server, or the like. In one embodiment, the server 102 provides a web page 110 to a local computer 104 upon a request for the web page 110 from the local computer 104. In one example, the server 102 and the local computer 104 includes at least one processor 118 and 122, respectively. Similarly, the server 102 and the local computer 104 may also include an interface 120 and 124, respectively.

For example, the user 108 at the local computer 104 may cause an application 114 to be executed on the local computer 104 and the application 114 may be a web browser that enables the user 108 to browse the Internet or other content available via the Internet protocol. The user 108 initiates the request from the local computer 104 to the server 102 for the web page 110, such as an attempt to retrieve a web page from a web site. In response to the request, the server 102 provides the requested web page 110 to the application 114 at the local computer 104. In another embodiment, the local computer 104 may be a client computer, a personal computer, a laptop, a personal digital assistant (PDA), a cellular phone, a smartphone, or the like.

In a typical example of a web page, it is customary and common to provide a 1-2 line "action toolbar" in many web properties such as online or web-based electronic mail (e-mail) accounts or calendar accounts. However, these kinds of toolbars have limited real estate and effectiveness. Because web services like e-mail and calendar accounts desire to keep experiences lightweight and offer as much real-estate to the users' content as possible, the action toolbars are kept slim (1-2 lines) and scaling options are kept at a minimum (usually simply wrapping to the next line to ensure optimum web page performance). It can only expose a few primary tasks (such as 'delete', 'junk', and 'new' in mail) and secondary tasks (such as 'print' and 'move to folder' in mail). Thus, users are often times unaware of many features an application offers, as these features can only be found in Options and other "hidden" places in the user interface (UI) of the web services.

For example, a user might have to search for the junk mail filters deep within options in today's services. Another example is security of the services, and security is very important to users. However, currently, there is simply no good strategy to provide it visibly on-screen. This makes users less productive within the service than is desired. Additionally this current action toolbar strategy provides little to no opportunities to encourage usage of features and experiences that are tangential to the service a user is in, thus making them less engaged with the full suite of offerings from a service. For example, there is no way to visibly offer the ability to create a new calendar event from e-mail, even though this is a desirable task to users. This 1-2 line toolbar also does not scale as the service becomes more robust, thus causing the service to put additional actions, modes, etc., in the UI, rather than in the action area. For an instance, text editing features in 'Compose mail' may often be found somewhere near the message area and modes for day/week/month views of calendars may often be found below the action toolbar or in the left column. This arrangement may create a disjointed experience whereby the user must 'hunt down' actions around the page, rather than their desired experience of finding all actions in one place.

Embodiments of the invention improve over existing web toolbar implementations by increasing productivity within the service, improving simplicity/ease of finding and doing desired tasks, and engaging further with cross-service features and experiences. In one embodiment, a web adapted toolbar UI consolidates features and actions in groups, while at the same time addresses the specific nuances and needs of the user in the web environment, the capabilities and constraints imposed by prioritizing the different action controls as the viewable or display size of the web page changes. In another embodiment, the web page toolbar UI 116 further can optionally display a classification section or a tabbed section that further group or organize one or more groups of action controls. Furthermore, each of the action controls may be presented with label or without label for the user 108. As such, the web page toolbar UI 116 offers 1) simplicity desired in a web service (e.g., there are often much fewer options in many web services than there are in client-based application; users often find versions with too many visible options as 'overwhelming and complex'), 2) technical capabilities/constraints of state saving and its effect on performance (e.g., state saving in mail requires caching/saving users location and activities which effects speed of the service), and 3) optimization of screen real-estate to show the most amount of the users' content (e.g., with only a home tab and with labels that are deemed unnecessary for such intuitive modules as "new" and "communicate" users feel they are giving up unnecessary space). Furthermore, alternative embodiments may incorporate or integrate the web page toolbar UI 116 to the web applications/services (e.g., application 114) and improves familiarity and desirability as they move from one service to the other without relying on the typical static toolbar applications downloaded by the users.

Figure 2:
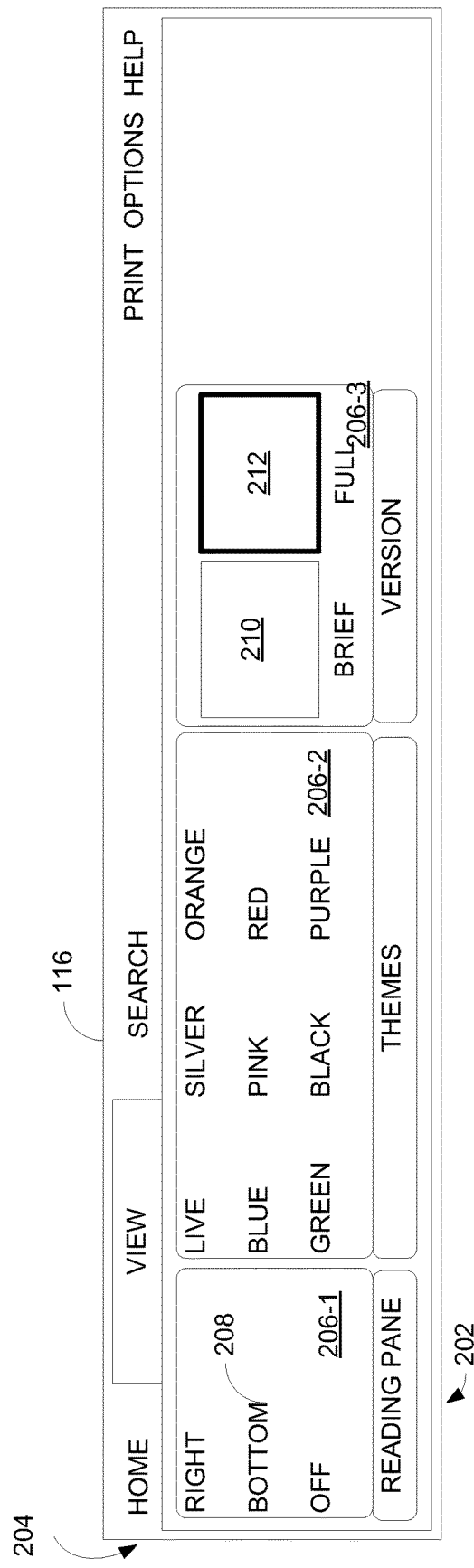
FIGS. 2-6 and 8-10 are screen displays illustrating implementations of a web page toolbar user interface (UI) according to an embodiment of the invention.

Referring now to FIGS. 2-6 and 8-13, screen displays of one or more embodiments of the invention are described. In FIG. 2, a web page toolbar UI 116 includes a section 202 having one or more groups of action controls. For example, the section 202 includes a first group 206-1, a second group 206-2, and a third group 206-3. In one example, the first group 206-1 includes one or more action controls 208. For instance, the group 206-1 includes action controls 208, such as "Right," "Bottom," or "Off" for controlling the position of a preview pane (not shown). In another example, the group 206-2 includes action controls 208, such as "Live," "Silver," "Black," etc., for displaying the background of the section 202 or other parts of the web page toolbar UI 116 in various colors. Group 206-3 includes action controls 210 "Brief" and 212 "Full". In other words, embodiments of the invention may group the action controls depending on their functionalities. In another embodiment, texts, icons, or a combination thereof linking to the computer-executable instructions for executing the desirable functions may represent each of the action controls 208.

Alternative aspects of the invention may display web page toolbar UI 116 without labels around the action groupings. For example, the labels may be removed to free up space for content, to remove complexity/aid in simplicity, and to optimize for web performance. In addition, the web page toolbar UI 116 may include one or more headers, which may indicate a web service.

In another embodiment, the web page toolbar UI 116 may also include a classification section 204 for classifying one or more groups having action controls. For example, the classification section 204 may be implemented as "tabs" on the top of the web page toolbar UI 116. As described in FIG. 2, the web page toolbar UI 116 includes the following classifications or tabs: "Home," "View," and "Search". Other classifications or tabs may be included in the classification section 204 without departing from the scope or spirit of the invention.

Figure 3:
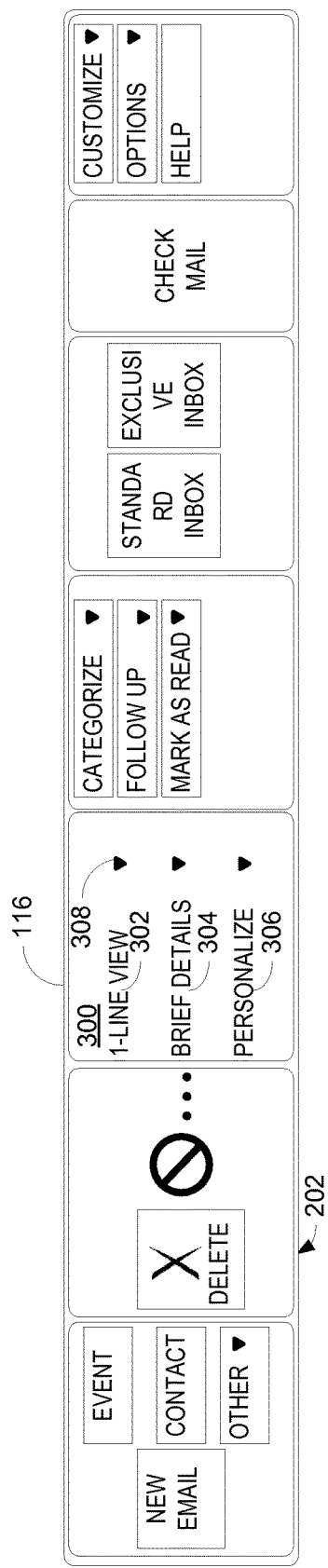

In yet another embodiment, the web page toolbar UI 116 may be implemented without the classification section 204, as shown in FIG. 3. In such an implementation, the web page toolbar UI 116 may provide alternative arrangement or placement of the action controls when compared to the web page toolbar UI 116 with the classification section 204. For example, in FIG. 3, a grouping 300 includes the following action controls: "1-line view" control 302, "Brief details" control 304 and "Personalize" control 306. In this implementation without the classification section 204 as in FIG. 2, the action controls in the group 206-2 in FIG. 2 are condensed to the "Personalize" control 306 with a down arrow showing more choices are available. Similarly, the "Brief details" control 304 is also a condensed or compacted version of the action controls shown in the group 206-3 in FIG. 2. In another embodiment, the web page toolbar UI 116 in FIG. 3 illustrates that the one or more compacted version of the action controls may be expanded to a module group in a web page toolbar UI with the classification section.

Figure 4:
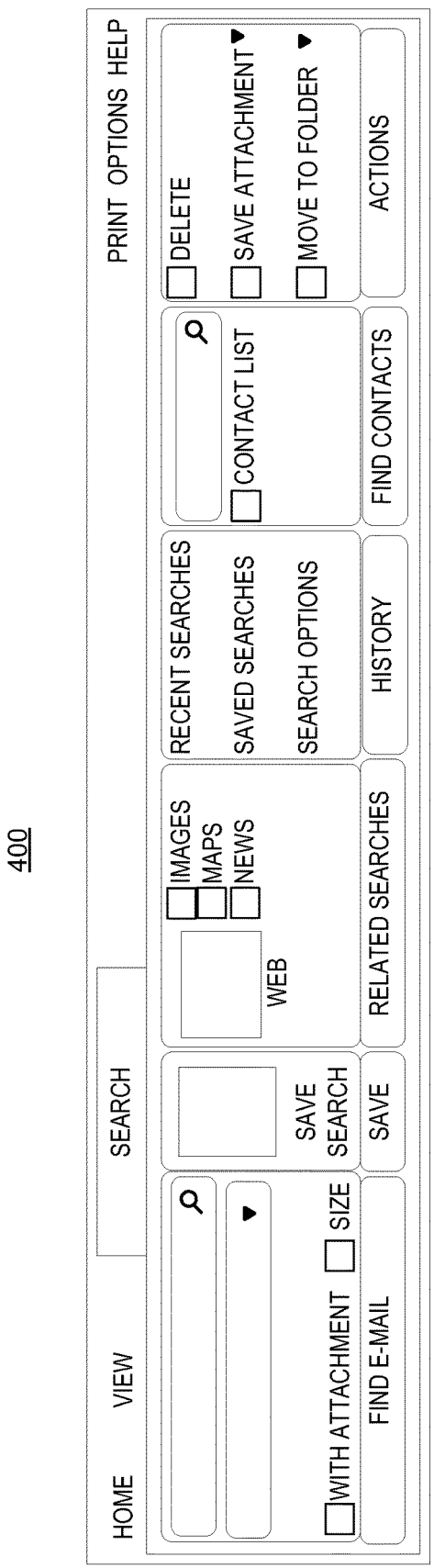

In a similar implementation, FIG. 4 illustrates the web page toolbar UI 116 under a different classification (or tab)

and the action controls associated therewith. In this implementation, the web page toolbar UI 116 illustrates the action controls in different groups under the classification or the tab of "search." It is to be understood that other classifications or tabs may be implemented or used without departing from the scope or spirit of the present invention.

Figure 5:
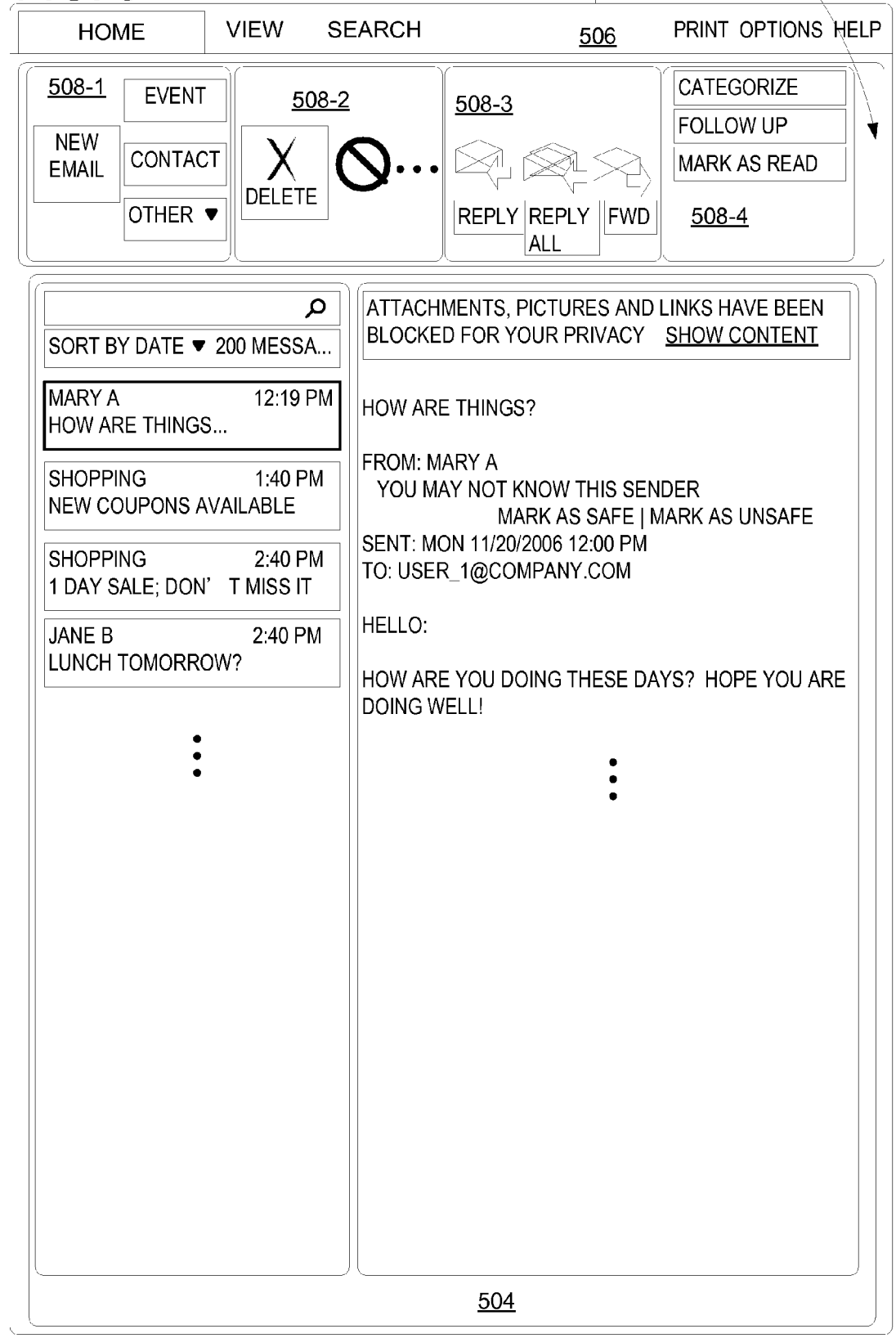

Referring now to FIG. 5, the web page 110 illustrates the incorporation of the web page toolbar UI 116. As previously described, the web page 110 may be any web page transmitted to the local computer 104 from the server 102. In one embodiment, the web page 110 includes information for enabling the user 108 to access a web service, such as an online e-mail account, online calendar, messenger, messaging, or other services. As such, the web page 110 includes a toolbar section 502 and a content section 504. The toolbar section 502 includes the web page toolbar UI 116 while the content section 504 includes the content of the web page 110. For example, toolbar section 502 may include action controls 508-1, such as "New Email," "Event," "Contact," and "Other." In the illustrated embodiment, toolbar section 502 further includes action controls 508-2, such as "Delete" and action controls 508-3, such as "Reply," "Reply All," and "Fwd." The illustrated embodiment further includes action controls 508-4, such as "Categorize," "Follow Up," "Mark as Read." In one embodiment, functions represented by one or more action controls included in the web page toolbar UI 116 may not trigger or result in any changes in the content section 504 of the web page 110. In other words, a portion of the action controls does not enable content changes in the content section 504. The action controls enable the user 108 to interact with other portions of the action controls. For example, when the user 108 changes one classification from another, the content of the content section 504 remains unchanged. In another embodiment, a state of the content of the page is saved or maintained. In a situation where the web page 110 is displaying an inbox of the e-mail account, when the user 108 switches from a "Home" classification/tab to a "Customize" classification/tab, the classification/tab will change accordingly but such classification/tab switching does not navigate the user 108 away from the content in the content section 504.

In another embodiment, functions of the action controls include one or more actions with one of the following characteristics or properties:

1. an action may, when selected, execute a command on the page (e.g., selecting delete will delete any mails that are checked);

2. an action may have on/off states (e.g. selecting and deselecting the bold icon will activate/deactivate bolding);

3. an action may, when selected, spawn a new tab (e.g., selecting 'attach photo' action icon might spawn a tab in the ribbon called 'photos' with more photos options);

4. an action may, when selected, spawn a floating window or other new element on the page (e.g., selecting 'attach photo' action icon might spawn a pop-up window called 'photos' with more photos options);

5. an action may, when selected, launch a new window or new page (e.g., selecting 'new event' might either open a new window with a calendar invite or navigate the user away from the current page to the calendar event creation page with the calendar ribbon);

6. an action may, when selected, provide an in-line or pop-up notification (e.g., telling the user they have 'no items selected' when they press 'delete' but haven't checked any boxes); and 7. an action may, when selected, provide more options via a drop-down menu (e.g., choosing 'other' might open a dropdown with all of the choices of things the user can do).

In another embodiment, one or more action controls may also provide information regarding the mode of the web page 110. For example, the web page toolbar UI 116 may include modal buttons or action controls that, when selected, change the modality of the page (e.g., choosing day view would change the calendar page to one type of view where only 1 day shows and choosing month view would show a full 4-5 week month view; changing from edit to view mode on a personal web page; changing from reading pane on right to reading pane on bottom).

In another example, a filters/sorts/searches action control may be included using drop-down menus, or other elements that, when selected, filter, sort, or refine the content in the content section 504 in some way. When a filter, sort, or search action control is selected, the content in the content section 504 may change based on that choice (e.g., selecting 'find by subject).

In another example, the web page toolbar UI 116 may include a split button arrow (e.g., an arrow 308) associated with a given action control. For example, the split button arrow directly next to an action control may open a list of related things to that action (e.g., selecting an arrow that is next to an action (such as Junk) may result in a drop-down with a variety of different junk options, such as "mark as phishing" and "unsubscribe").

In addition, alternative embodiments of the invention may include text entry fields (e.g., changing the user's personal message; typing in a search refinement term, etc.), or action controls that create a separate window (e.g., a flyout) with refined choices (e.g., selecting a person to talk to might open a fly-out that gives options for which way a user would like to contact the person via e-mail or instant messaging, etc.). In another embodiment, the web page toolbar UI 116 may also include highlight buttons, that, when selected, highlight between different types of content on the page (e.g., choosing 'safe senders' might highlight all mails from safe senders and then choosing "unsafe senders" would highlight 'unsafe senders'). Other alternative embodiments may include toggle buttons, that, when selected, toggle between different modes (e.g., selecting "B" in Compose classification toggles between Bold and Regular font).

Figure 6:
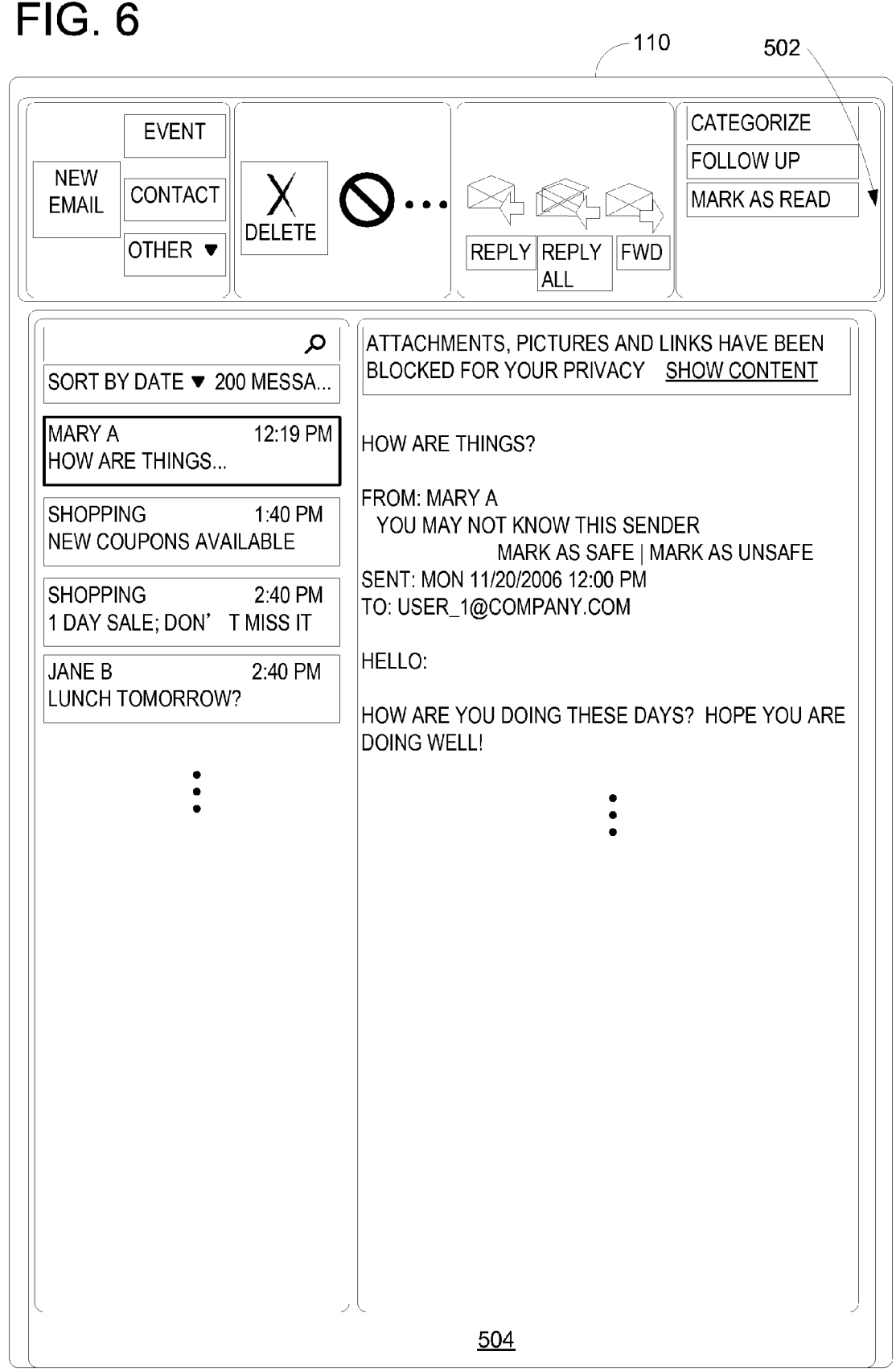

In another embodiment, a separate classification section 506 may be included on the web page 110 where the one or more action controls in the classification section (e.g., classification section 204) are included. On the other hand, FIG. 6 illustrates the web page 110 with the web page toolbar UI 116 having no classification section 506.

Figure 7:
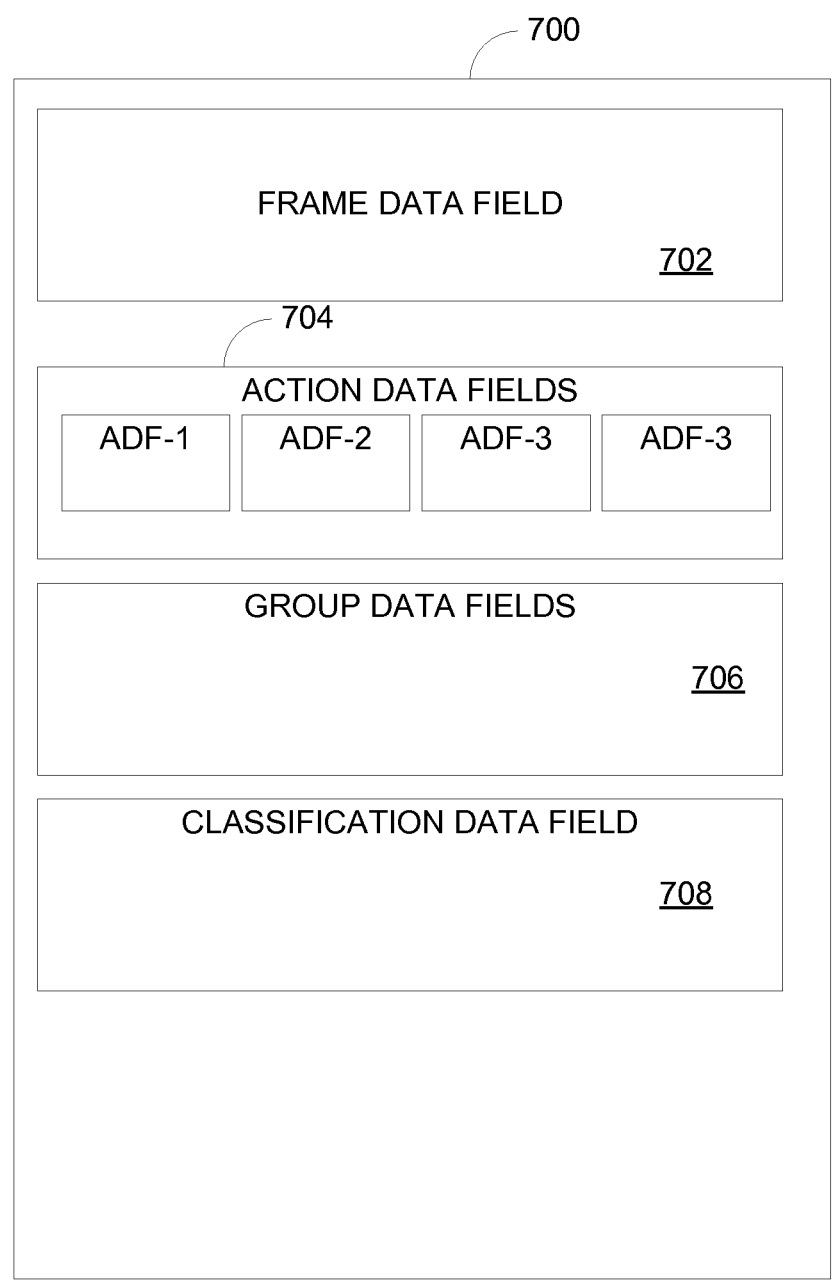
FIG. 7 is a block diagram illustrating a data structure storing data for providing a web page toolbar UI according to an embodiment of the invention.

Referring now to FIG. 7, a block diagram illustrates a data structure 700 storing data for providing a web page toolbar UI on a web page according to an embodiment of the invention. The data structure 700 includes a frame data field 702 for storing data for a display dimension for displaying the toolbar section. For example, the display dimension of the toolbar section includes a height and width for the toolbar section 502 of the web page 110. In one embodiment, the display dimension of the toolbar section may correlate to a display dimension of the web page toolbar UI 116. In another embodiment, the display dimension of the frame data field 702 is determined by a resolution size of a display screen of the local computer 104.

The data structure 700 also includes action data fields 704 storing data for one or more action controls and each of the action data fields stores properties of the one of the action controls. For example, each of the action data fields 704 may include properties such as a size of the graphical UI (GUI) of the action control (e.g., button size), label text of the action control, an identifier of the action control, and a parameter of the action control. The data structure 700 further includes group data fields 706 for storing data for one or more action groups to be displayed. Each of the group data fields stores data identifying the one or more action controls to be included in the one of the action groups for displaying in the toolbar section.

Each of the group data fields further stores data representing priorities of the one or more action controls in the action groups. For example, the priorities of the one or more action controls represent or identify a relative importance of the one or more of the action controls within a group or within a classification. The priorities of the one or more action controls determine or aid the determination which of the action controls is to be displayed according to the display dimension. In one example, the priorities may be pre-determined. In another example, the priorities may be dynamically modified based on the user experience and user frequency. In another embodiment, the grouping and ordering of the actions are determined by at least one of the following: grouping of tasks (e.g. Reply and Reply all are a pair); relevance (e.g. In Search tab, search related modules/actions go before other actions such as Delete, Save attachment, and Move to folder) and "positive" parameter (e.g., "positive" actions come before "negative" ones. (e.g. Save goes before Cancel.)

Figure 8:
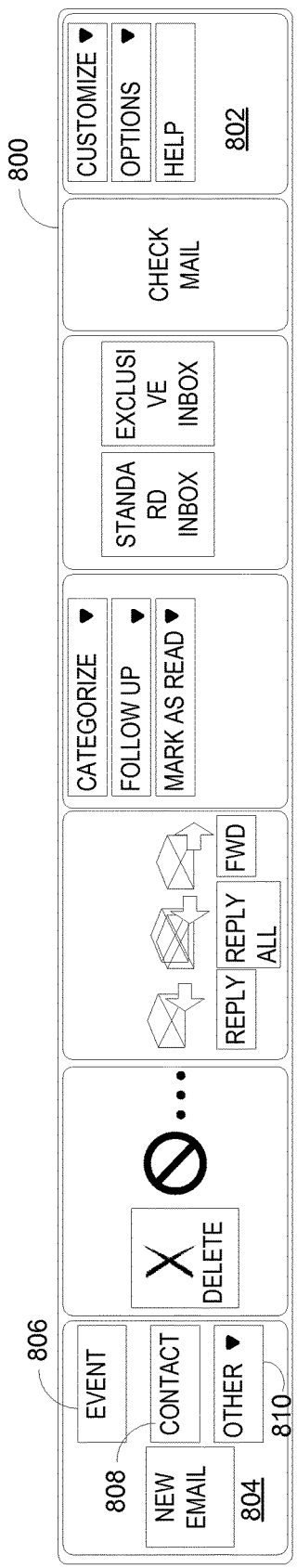
Figure 9:
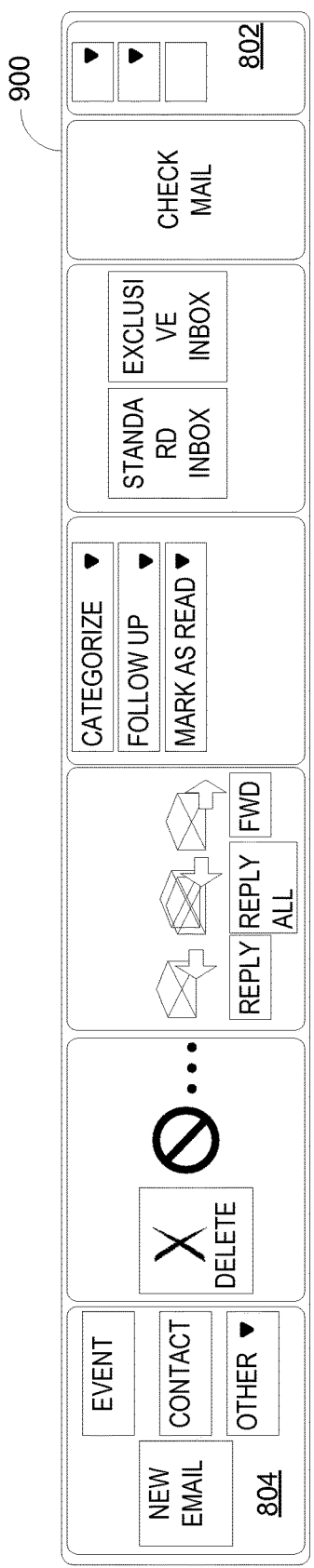
Figure 10:
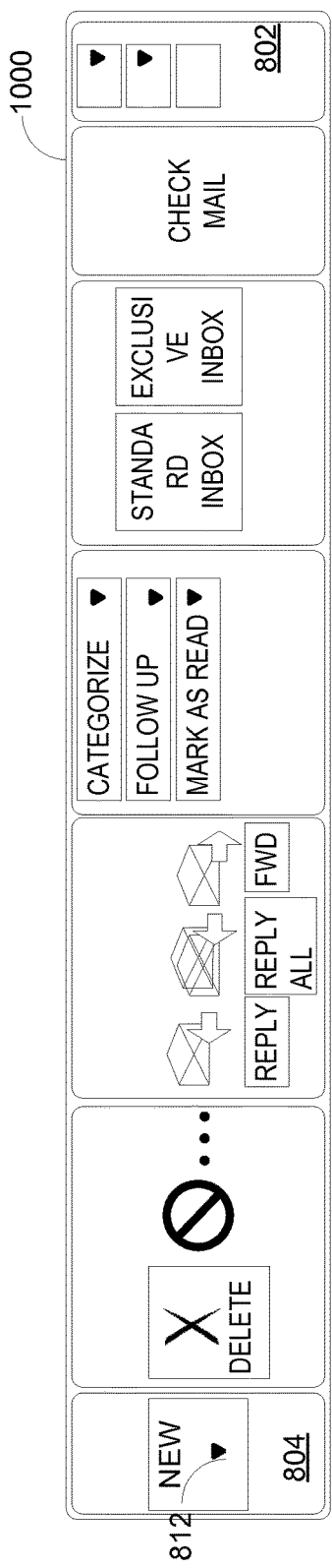

For example, as previously described, the user 108 may modify the display or viewable size of the web page 110 or the application 114. As such, action controls with a higher priority may be viewable in a certain display dimension size while action controls in a lower priority may not be displayed directly if the display dimension size is smaller than a certain size. FIGS. 8-10 below illustrate these exemplary implementations.

In a further embodiment, the data structure 700 further includes a classification data field 708 for storing data for action classifications. Each of the action classifications in the classification data field 708 identifies the one or more action groups to be included therein, such as the classification section 204 in FIG. 2.

In FIG. 8, a web page toolbar UI 800 displays one or more action controls in one or more groups. In this embodiment, the web page toolbar UI 800 displays the one or more action controls in an optimum and most advantageous display option. For example, the web page toolbar UI 800 may display the action controls according to a default display dimension of 1024×768 pixels. Such default display dimension presents the action controls to effect an advantageous user experience. For example, the web page toolbar UI 800 displays the action controls in a group 802 having all action controls with the appearing with a rather large size. However, sometimes the default display dimension may not be obtainable. Hence, FIG. 9 illustrates another web page toolbar UI 900 where the display dimension is less than a pre-determined size or default size. In this embodiment, the web page toolbar UI 900 has a display dimension size less than that of the web page toolbar UI 800. However, while the web page toolbar UI 900 includes the same types of action controls as the web page toolbar UI 800, the group 802 in the web page toolbar UI 900 is truncated or displayed with less viewable area. According to embodiments of the invention, this is based in part on the priorities of the action controls in the group. For example, the priorities of the action controls in the group 802 may be lower than that of those in the other groups. As such, the web page toolbar UI 900 displays less viewable area for the group 802.

In further embodiment, FIG. 10 illustrates a further web page toolbar UI 1000 with an even smaller size (in terms of width) than the web page toolbar UI 900. In this example, action controls in a group 804 further reduce their display dimension such that action controls 806 ("Event"), 808 "Contact," and 810 "Other" (shown in FIG. 8) have been truncated or collapsed to a split button arrow 812 (shown in FIG. 10). Therefore, the priorities of the action controls determine or assist in determining how the action controls are displayed in the toolbar section of the web page 110.

As such, embodiments of the invention selectively provide a classification or tab section for expanding the organization of the action controls; provide variations of groupings of the action controls with at least one of the following controls: action controls for module labels, without classifications/tabs; action controls without classifications/tabs and without module labels; action controls with or without classifications/tabs under a header; action controls whose actions are combined with actions for a larger suite of web services; various placement of different action controls in the web page toolbar UI; and action controls (tabbed or no-tabbed) are to the right of a left navigation column and versions where the ribbon begins at the left-most corner of the page.

Other advantages over existing implementations include enabling the web page toolbar UI to be scalable without making the action controls to be outside of the viewable area to the user as soon as the display dimension decreases. That is, when the display dimension of the web page decreases, current implementations only employ two types of responses: wrap the action controls in a second line or row and gradually remove the action controls and use a "more" button or similar icon or arrow to indicate to the user that there are more action controls available. There is no grouping of the action controls. Furthermore, aspects of the invention identify a state of the content and provide the relevant action controls based on the state of the content (e.g., signed-in state, signed-out state). In another alternative embodiment, the action controls may be initially displayed with three rows of small icons or one row of large icons.

It is to be understood that various types of action controls may be included without departing from the scope or spirit of embodiments of the invention. For example, under a "Compose" action control, the functions or operations of the "Compose" action control may differ based on the context. For example, when a user is sending an e-mail message, the same action control may also enable the user to compose an entry to a web log ("blog"). Similarly, when the user attaches a photo to a message, the "Compose" action control may enable the user to edit new photo or metadata associated therewith. Also, when a user wishes to add new stationary, signatures, or emoticons, the same action control enables the user to achieve such task.

Also, the action controls in the web page toolbar UI 116 may combine action controls from a larger suite of web services. For example, action controls specific to a particular web service (such as e-mail) may be combined with actions for the broader suite of services offered (e.g., Personalized web portal). In this example, the 'Home' classification/tab may include all actions specific to the service the user is in (e.g., selecting 'delete' on the "Home" classification/tab in e-mail will delete Mail) and the rest of the tabs include actions specific to the whole suite of services (e.g., selecting a color under customize from within e-mail account will also change the color in e-mail, calendar, blog, and any other services offered by the suite).

Figure 11:
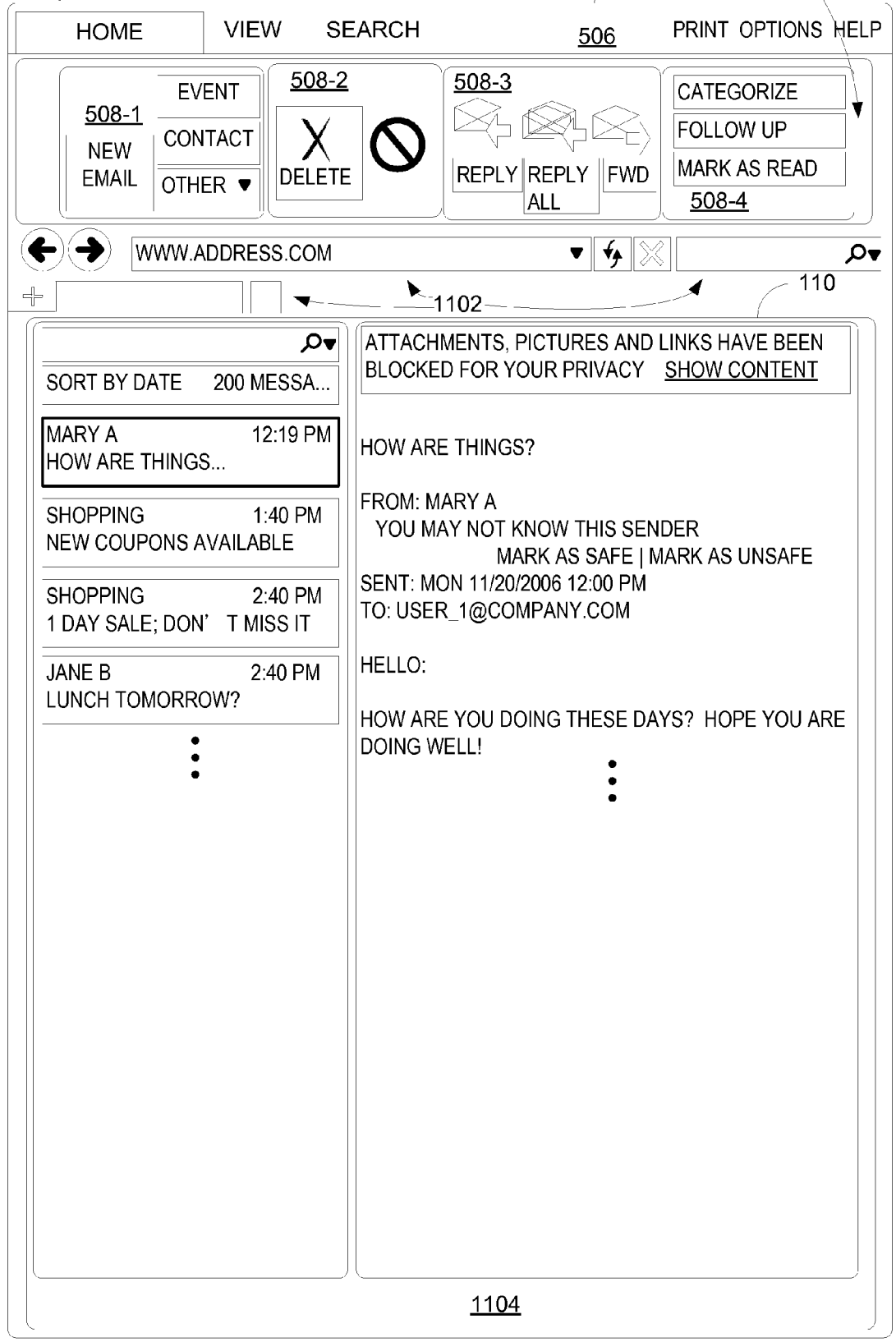
FIG. 11 is a block diagram illustrating a web page toolbar UI being integrated to a host UI of an application according to an embodiment of the invention.

In an alternative embodiment of the invention, the web page toolbar UI 116 may be incorporated into the UI of the application 110. FIG. 11 illustrates a screen display 1100 showing the web page toolbar UI 116 being integrated into the UI of the application 110 when displaying the web page 110 according to an embodiment of the invention. For example, FIG. 11 illustrates a screen display of an application window 1100 for the application 114. In one example, the application 114 may be a web browser application or other applications that are capable of rendering web or online content. The application window 1100 includes a host UI 1102 having one or more controls to navigate from one web site to one web site. For example, the host UI 1102 may include an address bar, a forward button, a backward button, or a search bar. The application window 1100 also includes a content section 1104 for displaying content of the web page 110.

In existing implementations, an application that is capable of displaying web pages displays the web page content in the content section 1104. The web page content would include all content, such as action controls associated with the rest of the content in the web page. One of such examples includes a web-based e-mail account. Existing implementations would display the content in the web page without any modifications. In other words, when the user wishes to refresh the content, the action controls are also refreshed even though none of the action controls needs to be refreshed or reloaded. That is, the other content (e.g., e-mail messages) is typically what needs to be refreshed or reloaded.

Embodiments of the invention overcome the previous implementation's limitations by integrating or incorporating the web page toolbar UI 116 as previously described into the host UI of the application window 1102. As such, aspects of the invention provide a concurrent co-existing and dynamic web page toolbar UI 116 to the application window 1102 such that the application window 1102 enables the user to conveniently access the web page toolbar UI 116 from the application window 1102. As such, the operations from the host UI 1102 may separately apply to the content displayed in the content section 1104. The web page toolbar UI 116 may be updated or refreshed separately. Hence, aspects of the invention provide a better user experience in using the provided services via the web page 110. In another embodiment, if the services provided by the web page are related to one or more other applications installed on the local computer 104, the integrated web page toolbar UI 116 may include or provide a familiar UI as the locally installed other applications to the user.

Figure 12:
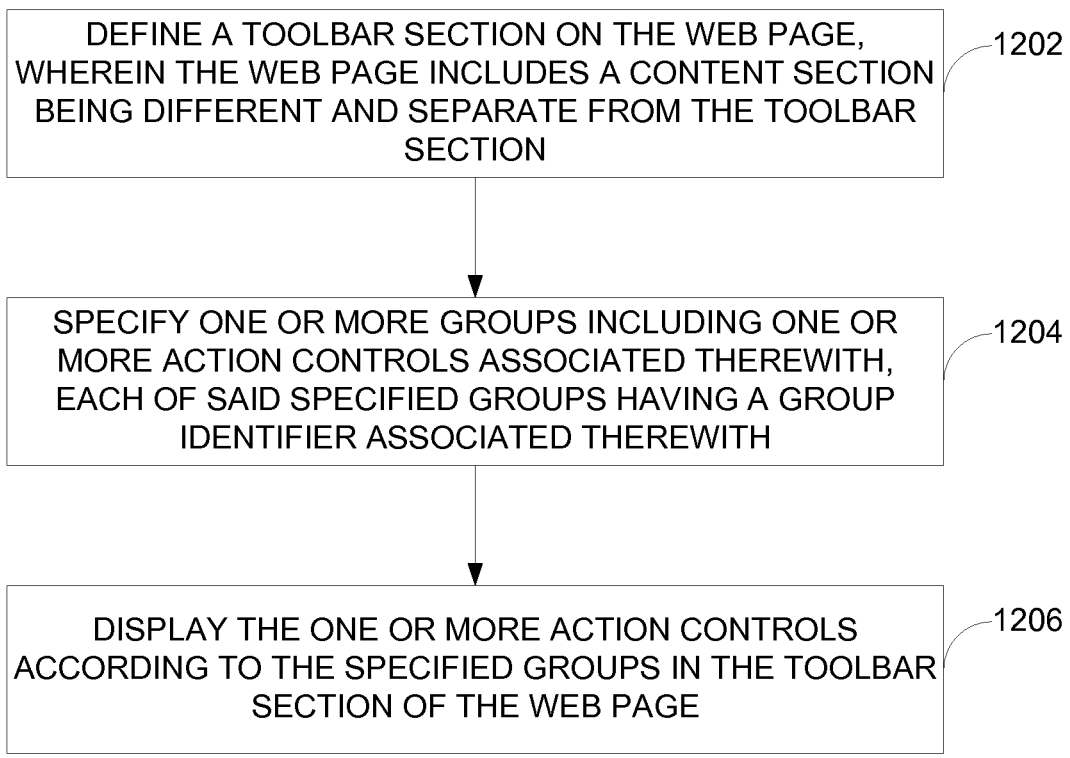
FIG. 12 is an exemplary flow chart illustrating operations of providing a flexible toolbar on a web page according to an embodiment of the invention.
Figure 13:
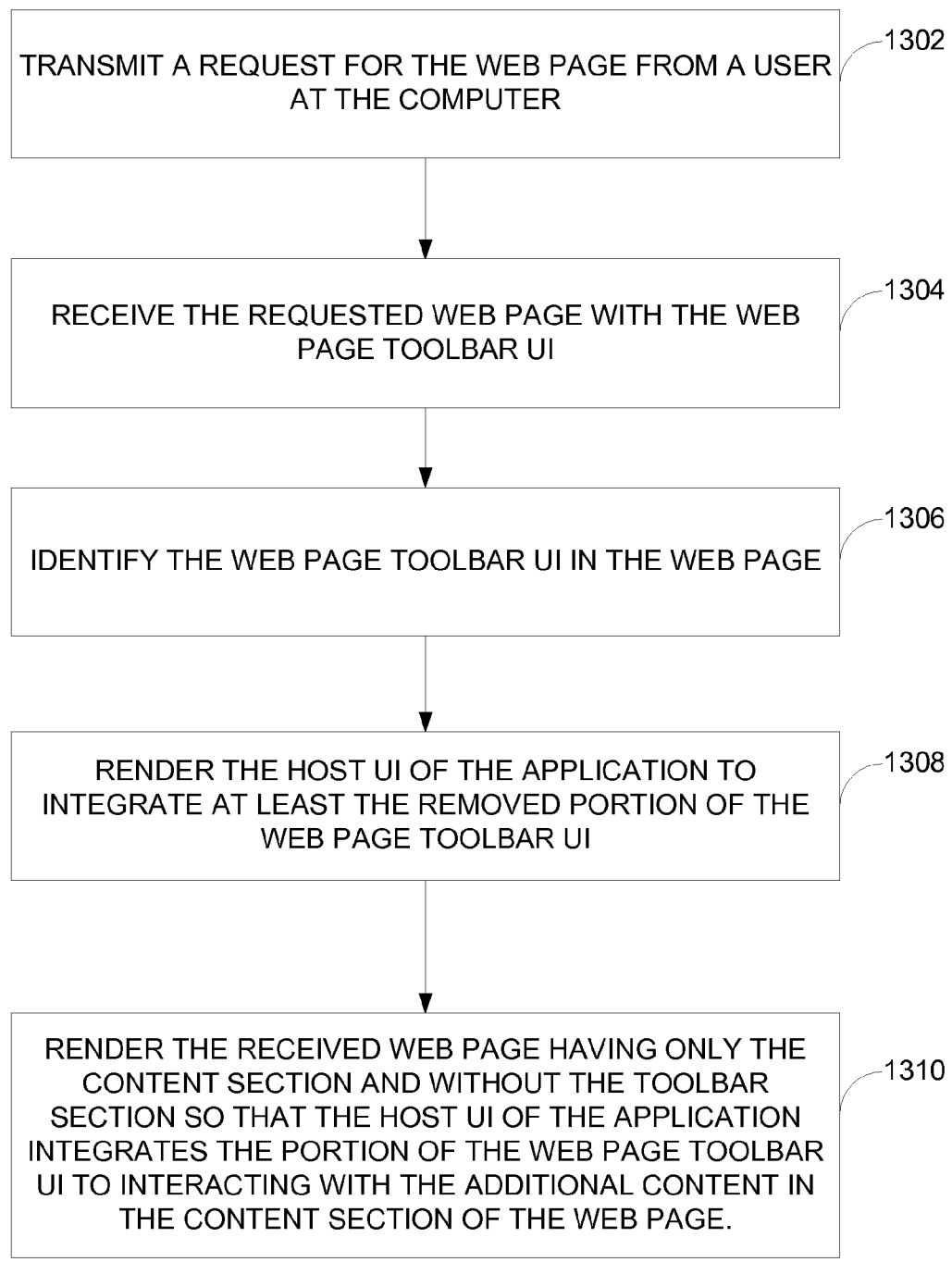
FIG. 13 is an exemplary flow chart illustrating operations of integrating a web page toolbar UI to a host UI of an application according to an embodiment of the invention.

In operation, embodiments of the invention may be practiced based at least in part from the operations illustrated in FIG. 12. For example, FIG. 12 illustrates a flow chart showing operations of providing a flexible toolbar on a web page according to an embodiment of the invention. For example, the server 102 or the local computer 104 defines a toolbar section on a web page (e.g., web page 110) at 1202. The web page includes a content section that is different and separate from the toolbar section. The content section displays additional content of the web page. At 1204, one or more groups are specified including one or more action controls associated therewith. Each of said specified groups has a group identifier associated therewith. For example, the action controls belong to a group labeled "Compose" may include a group identifier "compose-group" for identifying that the action controls belong to a particular group identifier. At 1206, the one or more action controls are displayed according to the specified groups in the toolbar section of the web page, and each of the one or more displayed action controls includes properties associated therewith. The included properties define at least one of the following: a name of the action control, a link of the action control, the group identifier of the action control, and a classification identifier of the action control. In a further embodiment, when the server 102 provides services to the local computer 104, the server 102 may further, in operation, transmit the web page toolbar UI 116 and the web page 110 to the local computer 104 such that the local computer 104 may display or render the web page 110 and the web page toolbar UI 116 to the user 108.

In an alternative embodiment, the web page toolbar UI 116 may be incorporated or integrated into the host UI of the application 114. In operation, this aspect of the invention may be implemented by receiving a request for a web page from a user at a local computer. The request is sent by the application from the local computer, and the web page includes the web page toolbar UI in a toolbar section. The web page includes additional content in a content section, and the web page toolbar UI includes one or more action controls having properties associated therewith for interacting with the content section. The web page toolbar UI has a particular display dimension associated therewith. The server 102 may also identify properties of the application, and the application may be a web browser operable to display the web page to the user. The server identifies the host UI of the application and removes a portion of the identified web page toolbar UI from the web page. Scripts or computer-executable instructions are transmitted from the server to the application for rendering the host UI of the application to integrate the web page toolbar UI. Also, the server 102 may transmit the requested web page having only the content section and without the toolbar section so that the host UI of the application integrates the web page toolbar UI for enabling interactions with the content section of the web page.

From another perspective, embodiments of the invention enable the application 114 installed on the local computer to integrate the web page toolbar UI 116 with the host UI 1102 of the application 114. In the operation for this aspect, according to FIG. 13, the application may first transmit a request for the web page from a user at the computer at 1302. The web page includes the web page toolbar UI in a toolbar section. The web page displays additional content in a content section of the web page. The web page toolbar UI includes one or more action controls having properties associated therewith for interacting with the additional content in the content section. Also, the web page toolbar UI has a particular display dimension associated therewith. At 1304, the requested web page with the web page toolbar UI is received at the application. The web page toolbar UI in the web page is identified at 1306 and a portion of the identified web page toolbar UI is removed from the received web page. In other words, in order for integrating the web page toolbar UI 116 with the host UI 1102, the application may need to remove the web page toolbar UI 116 from the web page 110. In an alternative embodiment, the application may separately request the web page toolbar UI 116 from the service provider or the server if it is predetermined that the application 114 can integrate the web page toolbar UI 116.

At 1308, the host UI of the application is rendered to integrate at least the removed portion of the web page toolbar UI. At 1310, the application renders the received web page having only the content section and without the toolbar section so that the host UI of the application integrates the portion of the web page toolbar UI to interacting with the additional content in the content section of the web page.

Overall, the server 102 or the local computer 104 (collective referred to as "computer" in the description below) typically has at least some form of computer readable media. Computer readable media, which include both volatile and nonvolatile media, removable and non-removable media, may be any available medium that may be accessed by computer. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Generally, the data processors of computer are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

In an alternative embodiment, a method is provided to dynamically incorporate a web page toolbar user interface (UI) with a host UI of an application installed on a computer. The method includes at least one of the following:

transmitting a request for the web page from a user at the computer, said web page including the web page toolbar UI in a toolbar section, said web page displaying additional content in a content section of the web page, said web page toolbar UI including one or more action controls having properties associated therewith for interacting with the additional content in the content section, said web page toolbar UI having a particular display dimension associated therewith;

receiving the requested web page with the web page toolbar UI;

identifying the web page toolbar UI in the web page;

removing a portion of the identified web page toolbar UI from the received web page;

rendering the host UI of the application to integrate at least the removed portion of the web page toolbar UI; and rendering the received web page having only the content section and without the toolbar section so that the host UI of the application integrates the portion of the web page toolbar UI to interacting with the additional content in the content section of the web page.

The method above may also include one or more of the following: the one or more action controls are associated with one or more action groups in the toolbar section, said each of the action groups having a group identifier and storing data representing priorities of the one or more action controls in the one or more action groups;

receiving comprises receiving the requested web page with a classification section in the toolbar section, said classification section having a classification identifier associating the one or more action controls in groups, and the rendering of the host UI comprises rendering the host UI of the application to integrate at least the removed portion of the web page toolbar UI and the classification section;

rendering comprises displaying the one or more action controls based on the group identifier of the each of the one or more action groups;

further including receiving user input for modifying a display dimension of the host UI of the application, and further including modifying the particular display dimension of the integrated web page toolbar UI in response to the received user input;

rendering the host UI of the application to integrate at least the removed portion of the web page toolbar UI comprises rendering the host UI of the application to integrate at least the removed portion of the web page toolbar UI with the one or more action controls as a function of at least one of the following: the priority of the action controls in the specified groups, the classification identifier of the action controls in the groups, and the modified display dimension of the web page toolbar UI; and rendering the host UI comprises rendering the host UI of the application to integrate at least the removed portion of the web page toolbar UI, said removed portion of the web page toolbar UI including the properties having at least one of the following: a portion of the properties enabling content changes in the content section and a portion of the properties responsive to user interactions without producing reactions in the content section.

In a further alternative embodiment, a method dynamically incorporates a web page toolbar user interface (UI) with a host UI of an application installed on a computer. The method includes at least one of the following:

receiving a request for the web page from a user at the computer, said request being sent by the application, said web page including the web page toolbar UI in a toolbar section, said web page including additional content in a content section, said web page toolbar UI including one or more action controls having properties associated therewith for interacting with the content section, said web page toolbar UI having a particular display dimension associated therewith;

identifying properties of the application, said application being a web browser operable to display the web page to the user;

identifying the host UI of the application;

removing a portion of the identified web page toolbar UI from the web page;

transmitting scripts to the application for rendering the host UI of the application to integrate the web page toolbar UI; and transmitting the requested web page having only the content section and without the toolbar section so that the host UI of the application integrates the web page toolbar UI for enabling interactions with the content section of the web page.

As a further example, the alternative embodiment above may be supplemented or modified according to at least one of the following:

transmitting a notification to the user before removing the portion of the identified web page toolbar UI, said notification indicating to the user that the web page toolbar UI is being removed;

that the one or more action controls are associated with one or more action groups in the toolbar section, said each of the action groups having a group identifier and storing data representing priorities of the one or more action controls in the one or more action groups;

receiving comprises receiving the requested web page with a classification section in the toolbar section, said classification section having a classification identifier defining each of the one or more action controls in the groups, and wherein rendering the host UI comprises rendering the host UI of the application to integrate at least the removed portion of the web page toolbar UI and the classification section;

rendering comprises displaying the one or more action controls based on the group identifier of the each of the one or more action groups;

receiving user input for modifying a display dimension of the host UI of the application, and further comprising modifying the particular display dimension of the integrated web page toolbar UI in response to the received user input;

rendering the host UI of the application to integrate at least the removed portion of the web page toolbar UI comprises rendering the host UI of the application to integrate at least the removed portion of the web page toolbar UI with the one or more action controls as a function of at least one of the following: the priority of the action controls in the specified groups, the classification identifier of the action controls in the groups, and the modified display dimension of the web page toolbar UI; and rendering the host UI comprises rendering the host UI of the application to integrate at least the removed portion of the web page toolbar UI including the properties having at least one of the following: a portion of the properties enabling content changes in the content section and a portion of the properties responsive to user interactions without producing reactions in the content section.

In a further alternative aspect of the invention, a system dynamically incorporates a web page toolbar user interface (UI) with a host UI of an application installed on a local computer. The system may include:

an interface for receiving a request for the web page from a user at the computer, said request being sent by the application, said web page including the web page toolbar UI in a toolbar section, said web page including additional content in a content section, said web page toolbar UI including one or more action controls having properties associated therewith for interacting with the content section, said web page toolbar UI having a particular display dimension associated therewith;

a processor configured to execute computer-executable instructions for:

identifying properties of the application from the received request, said application being a web browser operable to display the web page to the user;

identifying the host UI of the application;

removing a portion of the identified web page toolbar UI from the web page; and wherein the interface transmits scripts to the application for rendering the host UI of the application to integrate the web page toolbar UI; and wherein the interface transmits the requested web page having only the content section and without the toolbar section so that the host UI of the application integrates the web page toolbar UI for enabling interactions with the content section of the web page.

As an example, the system may further provide at least one of the following:

wherein the processor identifies the host UI comprises analyzing the identified properties of the application to determine displaying information of the identified host UI of the application, said identified properties including at least one of the following information: operating system of the local computer, version of the application, and size of a display screen of the local computer;

wherein the one or more action controls are associated with one or more action groups in the toolbar section, said each of the action groups having a group identifier and storing data representing priorities of the one or more action controls in the one or more action groups;

wherein the interface transmits the requested web page with a classification section in the toolbar section, said classification section having a classification identifier defining each of the one or more action controls in the groups, and wherein rendering the host UI comprises rendering the host UI of the application to integrate at least the removed portion of the web page toolbar UI and the classification section; and wherein the transmitted scripts include instructions to integrate at least the removed portion of the web page toolbar UI with the one or more action controls in the host UI as a function of at least one of the following: the priority of the action controls in the specified groups, the classification identifier of the action controls in the groups, and the modified display dimension of the web page toolbar UI.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for providing a user interface (UI) on a web page, said method comprising:

defining a toolbar section on the web page, wherein the web page includes a content section being different and separate from the toolbar section, said content section displaying content of the web page;

specifying one or more action groups including one or more action controls associated therewith, each of said specified one or more action groups having a group identifier associated therewith and each of said one or more action controls having properties and priorities associated therewith, said priorities identifying at least a frequency of use by a user, said properties of one of said action controls comprising:

an action type, wherein activation of the one of the action controls causes an action of the action type, said action type lacking association with any specific web site, wherein the caused action of the action type varies in accordance with an identification of a web application or service used to process the web page content loaded in the content section during composition of an e-mail; and displaying the one or more action controls in the toolbar section of the web page according to the specified one or more action groups and according to the priorities associated with the one or more action controls, said associated properties further defining at least one of the following: a name of the action control, a link of the action control, the group identifier of the action control, or a classification identifier of the action control.

2. The method of claim 1, further comprising defining a classification section in the toolbar section, said classification section defining the classification identifier of each of the one or more action controls in the one or more action groups, and wherein said displaying comprises displaying the one or more action controls according to the classification identifier in the classification section of the toolbar.

3. The method of claim 1, wherein defining comprises defining the toolbar section according to a display dimension of the toolbar section, said display dimension corresponding to a display dimension of the web page.

4. The method of claim 1, wherein displaying comprises displaying the one or more action controls according to the specified one or more action groups based on a corresponding group identifier of each of the one or more action controls, said group identifier of each of the one or more action controls defining a priority of the one or more action controls in the specified one or more action groups.

5. The method of claim 1, further comprising receiving user input for modifying the display dimension of the toolbar section.

6. The method of claim 5, wherein displaying comprises displaying the one or more action controls as a function of at least one of the following: the priority of the one or more action controls in the specified one or more groups, the classification identifier of the one or more action controls in the one or more groups, and the modified display dimension of the toolbar section.

7. The method of claim 1, wherein displaying comprises displaying the one or more action controls with each of the one or more displayed action controls including the properties having at least one of the following: a portion of the properties enabling content changes in the content section and a portion of the properties responsive to user interactions without producing reactions in the content section.

8. The method of claim 1, wherein said properties of the one of said action controls further comprising a first operation caused by activation of the action control when a first set of web page content during composition of the e-mail is in the content section, the first operation interacting with the first set of web page content, said first operation comprising a first action of the action type occurring within the context of the first set of web page content.

9. The method of claim 8, wherein said properties of the one of said action controls further comprising a second operation caused by activation of the action control when a second set of web page content during composition of the e-mail is in the content section, the second operation interacting with the second set of web page content, said second operation comprising a second action of the action type occurring within the context of the second set of web page content, said second action differing from the first action based on a contextual difference between the first set of web page content and the second set of web page content.

10. A system for providing a user interface (UI) on a web page, said system comprising:
a processor configured for executing computer-executable instructions for:
defining a toolbar section on the web page, wherein the web page includes a content section being different and separate from the toolbar section, said content section displaying content of the web page;
specifying one or more action groups including one or more action controls associated therewith, each of said specified one or more action groups having a group identifier associated therewith and each of said one or more action controls having properties and priorities associated therewith, said priorities identifying at least a frequency of use by a user, said properties of one of said action controls comprising:
an action type, wherein activation of the one of the action controls causes an action of the action type, said action type lacking association with any specific web site, wherein the caused action of the action type varies in accordance with an identification of a web application or service used to process the web page content loaded in the content section during composition of an e-mail; and
an interface for displaying the one or more action controls in the toolbar section of the web page according to the specified one or more action groups and according to a state of the web page content in the content section, wherein the interface displays the one or more action controls according to the frequency of use of each of the one or more action controls and at least one of the following: one row of icons with a first size in the toolbar section or three rows of icons with a second size in the toolbar section, each of said icons representing one of the action controls, said first size being greater than the second size.

11. The system of claim 10, wherein the processor is configured to further define a classification section in the toolbar section, said classification section defining the classification identifier of the one or more action controls in the one or more action groups, and wherein the interface displays the one or more action controls according to the classification identifier in the classification section of the toolbar.

12. The system of claim 10, wherein the processor defines the toolbar section according to a display dimension of the toolbar section, said display dimension corresponding to a display dimension of the web page.

13. The system of claim 10, wherein the included properties having at least one of the following: a portion of the properties enabling content changes in the content section and a portion of the properties responsive to user interactions without producing reactions in the content section, and wherein the properties define at least one of the following: a name of the action control, a link of the action control, the group identifier of the action control, and the classification identifier of the action control.

14. The system of claim 13, wherein the interface further receives user input for modifying the display dimension of the toolbar section, and wherein the interface displays the one or more action controls as a function of at least one of the following: the priority of the one or more action controls in the specified one or more action groups, the classification identifier of the one or more action controls in the one or more groups, and the modified display dimension of the toolbar section.

15. The system of claim 10, wherein the interface displays the one or more action controls according to the specified one or more action groups based on a corresponding group identifier of each of the one or more action controls, said group identifier of each of the one or more action controls defining a priority of the one or more action controls in the specified one or more action groups.

16. The system of claim 10, wherein said properties of the one of said action controls further comprising a first operation caused by activation of the action control when a first set of web page content during composition of the e-mail is in the content section, the first operation enabling a user to input data into the content section based on the context of the first set of web page content, said first operation comprising a first action of the action type based on the context of the first set of web page content.

17. The system of claim 16, wherein said properties of the one of said action controls further comprising a second operation caused by activation of the action control when a second set of web page content during composition of the e-mail is in the content section, the second operation enabling a user to input data into the content section based on the context of the second set of web page content, said second operation comprising a second action of the action type occurring based on the context of the second set of web page content, said second action differing from the first action based on a contextual difference between the first set of web page content and the second set of web page content.

18. A method for providing a user interface (UI) on a web page, said method comprising:
defining a toolbar section for the web page having a content section different and separate from the toolbar section, said content section being configured to display content of the web page;
specifying one or more action groups including one or more action controls associated therewith, each of said specified one or more action groups having a group identifier associated therewith and each of said one or more action controls having properties and priorities associated therewith, said priorities identifying at least a frequency of use by a user, said properties of one of said action controls comprising an action type, wherein activation of the one of the action controls causes an action of the action type lacking association with any specific web site, wherein the caused action of the action type varies in accordance with an identification of a web application or service used to process the web page content loaded in the content section; and causing the one or more action controls to be displayed in the toolbar section of the web page on a client device according to the specified one or more action groups and according to the priorities associated with the one or more action controls, said associated properties further defining at least one of a name of the action control, a link of the action control, the group identifier of the action control, or a classification identifier of the action control.

19. The method of claim 18, further comprising defining a classification section in the toolbar section, said classification section defining the classification identifier of each of the one or more action controls in the one or more action groups, and wherein said causing the one or more action controls to be displayed comprises causing the one or more action controls to be displayed according to the classification identifier in the classification section of the toolbar.

20. The method of claim 18, wherein defining comprises defining the toolbar section according to a display dimension of the toolbar section, said display dimension corresponding to a display dimension of the web page.

* * * * *